Dec. 11, 1928.

F. AESCHBACH 1,695,221

DOUGH KNEADING AND MIXING MACHINE

Filed Jan. 12, 1928

INVENTOR:
Friedrich Aeschbach,
By Henry Orth Jr
Atty

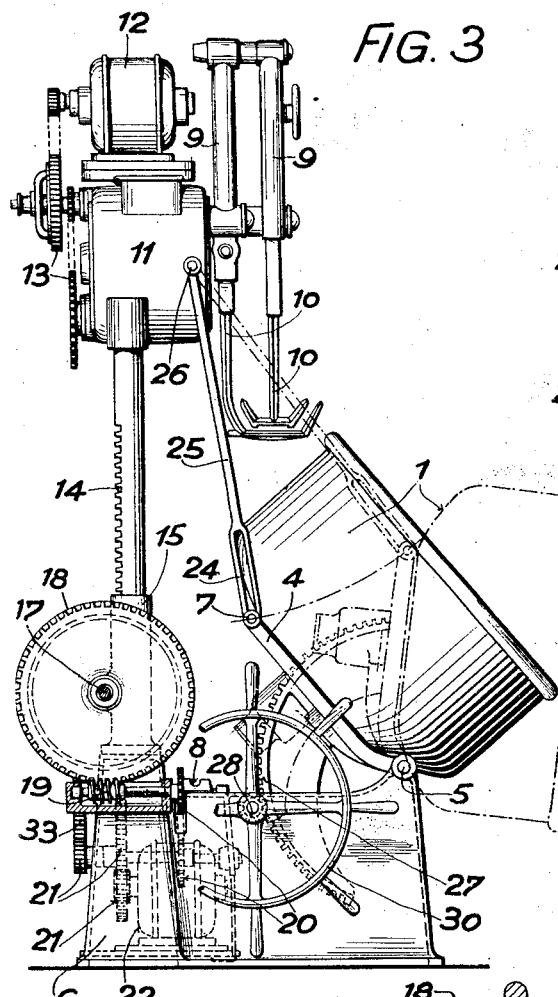
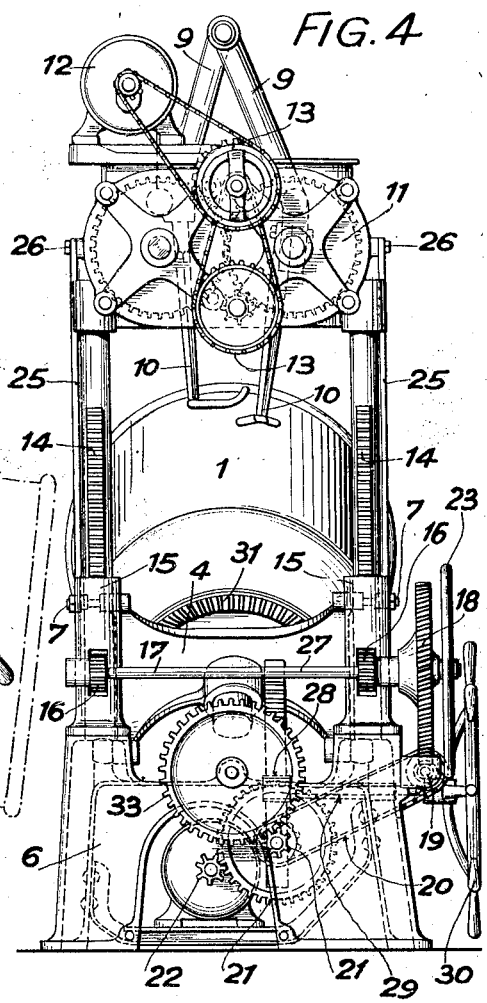
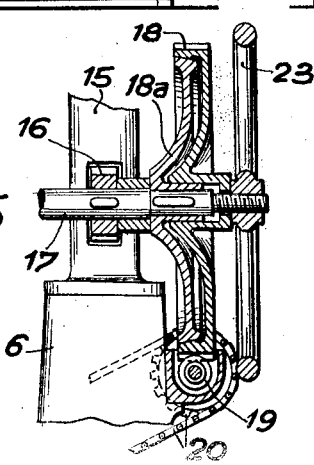

Patented Dec. 11, 1928.

1,695,221

UNITED STATES PATENT OFFICE.

FRIEDRICH AESCHBACH, OF AARAU, SWITZERLAND.

DOUGH KNEADING AND MIXING MACHINE.

Application filed January 12, 1928, Serial No. 246,272, and in Switzerland December 14, 1927.

Dough kneading and mixing machines are known having a tiltable kneading trough for receiving the dough and a kneading and mixing device for working the dough in the trough.

The machine according to the present invention shows the feature that the kneading and mixing device may be lifted and is in operative connection with the trough so that when the kneading and mixing device is raised the trough is automatically at least partly tilted.

A constructional example of the subject matter of the present invention is illustrated on the accompanying drawings, in which Fig. 1 shows partly in elevation and partly in a vertical section the kneading machine with the parts in the operative position;

Fig. 3 is a side view of the machine with parts shown in section, the kneading device being lifted and the trough tilted, Fig. 4 is an end view of the machine with the parts in the same position as in Fig. 3, and Fig. 5 is a section of a detail.

Figure 1:
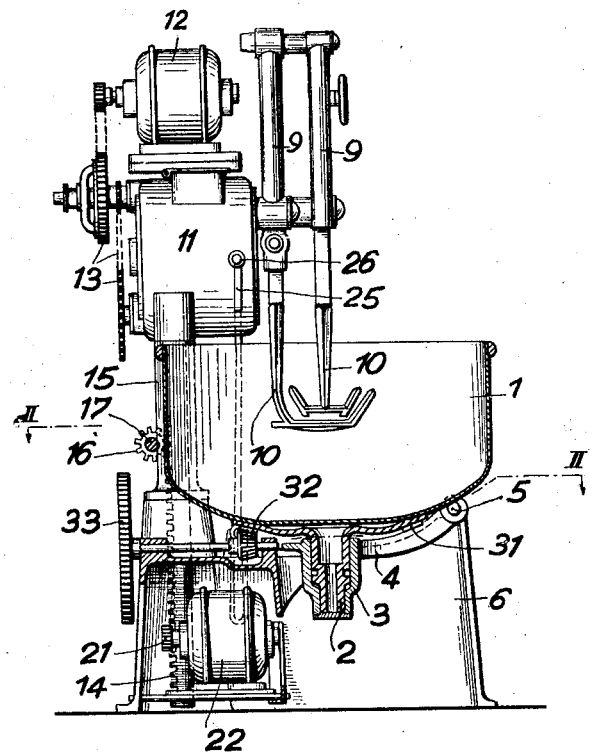
Figure 2:
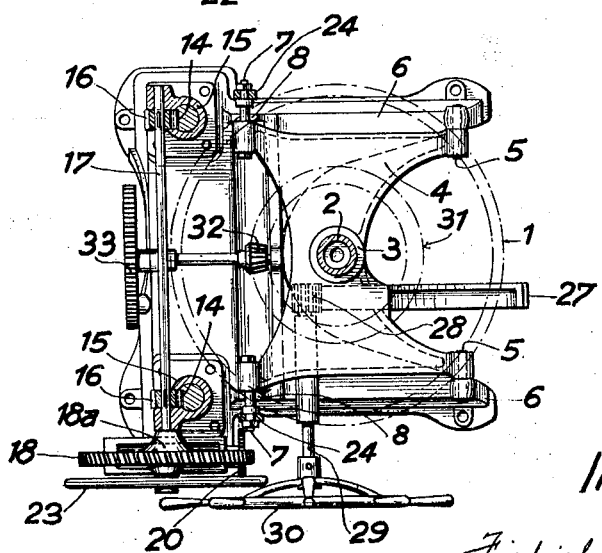
Fig. 2 is a section along line II—II in Fig. 1 with the trough removed.

In the drawings 1 denotes the kneading trough rotatably mounted by means of a vertical pin 2 in a bearing 3 which is rigidly fixed to a frame 4. The latter is on one side pivoted to the machine frame 6 by the hinge joints 5 and its other side rests loosely with pins 7 in open bearings 8. 9 designates the kneading arms carrying the kneaders 10. The latter are moved in a known manner in elliptical paths by gear wheels enclosed in the casings 11 and driven by the motor 12 over the transmission means 13. The parts 9—13 form together the kneading and mixing device.

With the subject matter of the present invention the kneading and mixing device is mounted on two toothed racks 14 displaceable in the vertical direction in guides 15 rigidly fixed to the machine frame 6, for the purpose of lifting the kneading and mixing device so that the kneaders 10 are withdrawn from the trough 1, which is essential before the latter can be tilted. With every toothed rack 14 a pinion 16 cooperates. Both pinions 16 are mounted on a shaft 17 to which is fixed a clutch part 18$^a$ of a worm wheel 18, which is loosely mounted on the shaft 17 (Fig. 5). The worm wheel 18 is rotated by a worm 19 which again is driven by a second electric motor 22 by the intermediary of a chain drive 20 and toothed gearing 21. If the disks 18 and 18$^a$ are firmly pressed against each other by means of the hand wheel 23 the motor 22 causes the rotation of the shaft 17. The kneading and mixing device 9—13 is thus raised by the motor 22 when the hand wheel 23 causes the engagement of the clutch parts 18, 18$^a$.

The rods 25 cooperate with longitudinal slots 24 at their one ends with the pins 7 of the frame 4 and are suspended at their other ends from pins 26 provided on the casing 11 of the kneading and mixing device.

To the bottom of the trough 1 a segment shaped toothed rim 27 is fixed with which a pinion 28 cooperates, the latter is fixed to a shaft 29 rotatably mounted in the machine frame 6 and turnably by the hand wheel 30.

The trough is provided at its bottom with a toothed rim 31 having bevel teeth which cooperates with a bevel wheel 32 when the trough is in its working position shown in Fig. 1; the bevel wheel 32 is driven from the motor 22 by the intermediary of the gear wheel 33 cooperating with a gear wheel of the toothed gearing 21, whereby the trough is rotated.

The manner of operation of the above described kneading machine is as follows:

With the parts in the position illustrated in Fig. 1 the kneading and mixing device is in its lowermost position and the kneaders 10 work on the dough in the trough 1 which is rotated by the motor 22, whilst the kneaders are driven by the motor 12. When the kneading and mixing operation is finished and the trough has to be tilted for emptying purposes, in the desired moment the hand wheel 23 is turned whereby the disk 18$^a$ is pressed into frictional engagement with the worm wheel 18 so that the motor 22 is coupled to the shaft 17. Thereby the toothed racks 14 and the whole kneading and mixing device 9—13 is raised from the position shown in Fig. 1 into that shown in Fig. 3. During the first part of this lifting movement the kneaders are withdrawn from the trough and the tie rods 25 do not act upon the trough owing to the slots 24. As soon as the lower end of the slots 24 engage the pins 7 during this raising movement the frame 4 together with the trough 1 is tilted by a turning motion about the hinges 5 into the position shown in full lines in Fig. 3. The motor 22 is then cut out either manually or automatically. Thereupon the tilting of the trough 1 is completed by turning the hand wheel 30 by hand causing the trough to be brought into the vertical position illustrated in chain dotted lines in Fig. 1. The manually operable tilting gear is provided to prevent excessive shocks occurring if the trough were tilted completely by the lifting movement of the kneading device.

In order to bring the parts of the machine back into the operative position the above operations are carried out in the reversed order and the direction of rotation of the motor 22 is reversed.

I claim:

1. In a dough mixing and kneading machine, in combination, a machine frame, a kneading trough tiltably mounted in said machine frame, a mixing and kneading device with kneaders cooperating with said kneading trough, means for raising said mixing and kneading device, and an interconnection between said means and the trough to cause a tilting movement of the latter by the raising movement.

2. In a dough mixing and kneading machine, in combination, a machine frame, a kneading trough tiltably mounted in said machine frame, a mixing and kneading device with kneaders cooperating with said kneading trough, means for raising said mixing and kneading device, an interconnection between said means and the trough to cause a tilting movement of the latter by the raising movement, and manually operable means for further tilting said trough.

3. In a dough mixing and kneading machine, in combination, a machine frame, a kneading trough tiltably mounted in said machine frame, a mixing and kneading device with kneaders cooperating with said kneading trough, vertical toothed racks on which said device is supported, pinions mounted on a shaft in said machine and cooperating with said toothed racks, an electric motor for rotating said trough, a disengageable clutch interposed between said motor and said shaft, and means interposed between said device and said trough for tilting the latter when said device is raised.

4. In a dough mixing and kneading machine, in combination, a machine frame, a kneading trough tiltably mounted in said machine frame, a mixing and kneading device with kneaders cooperating with said kneading trough, vertical toothed racks on which said device is supported, pinions mounted on a shaft in said machine and cooperating with said toothed racks, an electric motor for rotating said trough, a disengageable clutch interposed between said motor and said shaft, and means interposed between said device and said trough for tilting the latter when said device is raised, a lost motion being provided in said means to permit a raising movement of said device before the tilting of the trough is caused.

5. In a dough mixing and kneading machine, in combination, a machine frame, a kneading trough tiltably mounted in said machine frame, a mixing and kneading device with kneaders cooperating with said kneading trough, vertical toothed racks on which said device is supported, pinions mounted on a shaft in said machine and cooperating with said toothed racks, an electric motor for rotating said trough, a disengageable clutch interposed between said motor and said shaft, and tie rods interposed between said device and said trough, longitudinal slots being provided in said tie rods to permit a raising movement of said device before the tilting of the trough is caused.

6. In a dough mixing machine in combination; a machine frame, a kneading trough tiltably mounted in the frame, a mixing and kneading device, means for raising the kneading device out of the trough, and interconnection between said means and trough to tilt the trough during the end of the raising movement after the kneading devices have been raised clear of the trough.

In testimony whereof I have signed my name to this specification.

FRIEDRICH AESCHBACH.